W. A. WIESMAN.
FURNITURE FASTENING.
APPLICATION FILED SEPT. 25, 1915.
1,182,610.
Patented May 9, 1916.
2 SHEETS—SHEET 2.
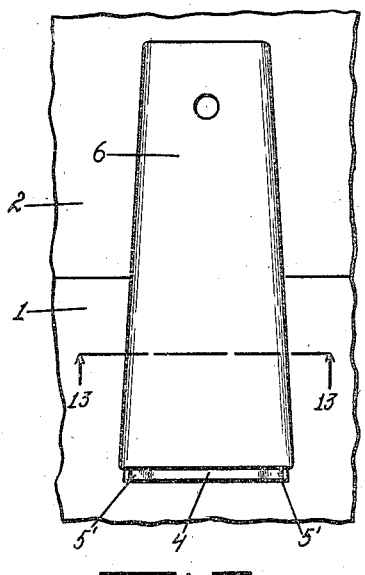
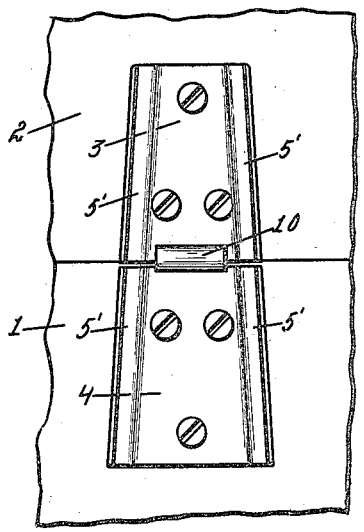
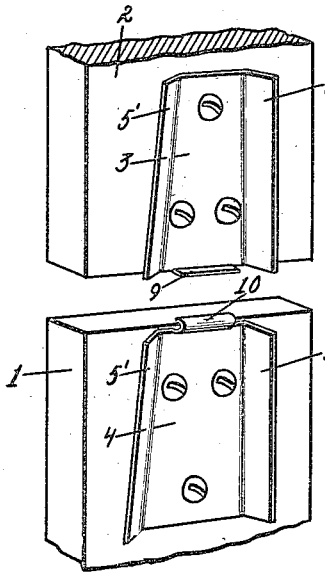
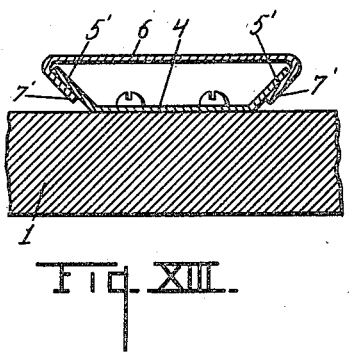
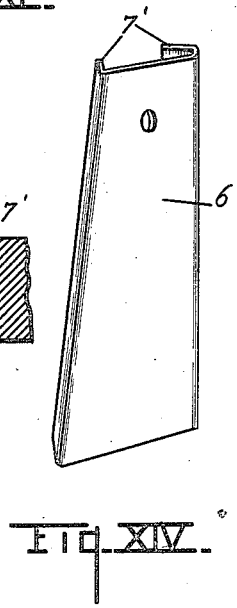
WITNESSES:
INVENTOR.
WILLIAM A. WIESMAN.
BY
ATTORNEYS.

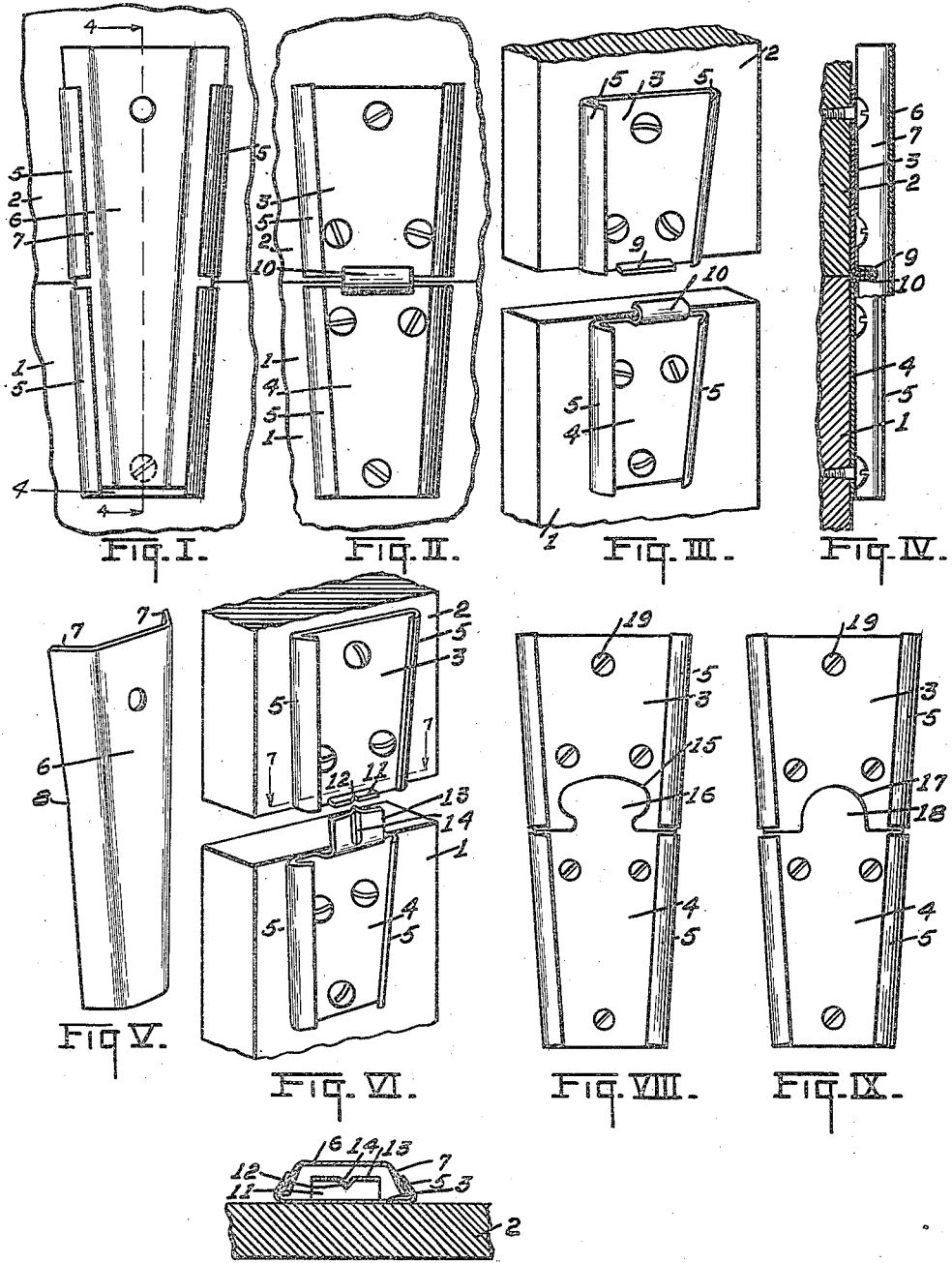

UNITED STATES PATENT OFFICE.

WILLIAM A. WIESMAN, OF GRAND RAPIDS, MICHIGAN, ASSIGNOR TO KEELER BRASS COMPANY, OF GRAND RAPIDS, MICHIGAN.

FURNITURE-FASTENING.

1,182,610.   Specification of Letters Patent.   Patented May 9, 1916.

Application filed September 25, 1915. Serial No. 52,612.

*To all whom it may concern:*

Be it known that I, WILLIAM A. WIESMAN, a citizen of the United States, residing at Grand Rapids, county of Kent, State of Michigan, have invented certain new and useful Improvements in Furniture-Fastenings, of which the following is a specification.

This invention relates to improvements in furniture fastenings.

My improved furniture fastening is especially designed by me for securing tops, such as mirror frames and the like, to dressers, bureaus and the like, and I have shown my improvements as I have embodied the same for such use, although fasteners embodying my improvements are adapted for use in various other relations.

The main objects of my invention are: First, to provide an improved fastening device by which the parts to be joined are rigidly and securely retained and at the same time to provide a fastening device which can be quickly and easily assembled to secure the parts to be united or disassembled to release the parts. Second, to provide an improved fastening which is compact and attractive in appearance.

Further objects, and objects relating to structural details, will definitely appear from the detailed description to follow. I accomplish the objects of my invention by the devices and means described in the following specification.

The invention is clearly defined and pointed out in the claims.

A structure which is a preferred embodiment of my invention is clearly illustrated in the accompanying drawings, forming a part of this specification, in which:

Figure I is a front view of my improved furniture fastening applied or mounted on parts to be joined, the parts to be joined being conventionally shown. Fig. II is a front view with the locking key removed. Fig. III is a detail perspective view showing the coupling members mounted upon the two parts to be joined, illustrating the manner of mounting the parts and of bringing them into coacting relation. Fig. IV is a detail longitudinal section on a line corresponding to line 4—4 of Fig. I. Fig. V is a perspective view of the locking key or wedge. Fig. VI is a detail perspective view of the coupling members of a modified form of my invention, the modification being in the co-engaging alining members of the coupling members. Fig. VII is a horizontal section on a line corresponding to line 7—7 of Fig. VI. Fig. VIII is a front view of another form of my invention, the modification being in the co-engaging alining members. Fig. IX is a front view of still another modified form of my invention. Fig. X is a front view of another modified form of my invention in which the flanges of the coupling members diverge instead of converging as in the hereinbefore described figures, and the locking key embraces the flanges instead of fitting within the same. Fig. XI is a rear view of the embodiment shown in Fig. X with the locking key removed. Fig. XII is a detail perspective view showing the coupling members of Fig. X mounted on the two parts to be joined illustrating the manner of mounting them and of bringing them into their coacting relation. Fig. XIII is a detail cross section on the line corresponding to line 13—13 of Fig. X. Fig. XIV is a perspective view of the locking key of the embodiment shown in Figs. X to XIII.

In the drawing, similar reference characters refer to similar parts throughout the several views, and the sectional views are taken looking in the direction of the little arrows at the ends of the section lines.

Referring to the drawing, 1 and 2 represent the parts of an article of furniture to be joined, as the body and mirror frame of a dresser or the like.

My improved fastener comprises a pair of coupling members 3 and 4 formed of sheet metal and having outwardly projecting flanges 5 at their longitudinal edges. These flanges are arranged either in a converging relation, as the flanges 5 of the embodiment shown in Figs. I to IX, inclusive, or in a diverging relation, as the flanges 5' of the embodiment shown in Figs. X to XIV, inclusive. The coupling members are disposed end to end and in alinement on the two sections or parts to be joined, as is illustrated. The taper of the two members is uniform, that is, the two members are of a continuous taper when brought into alinement, the large end of the one being of substantially the same width as the small end of the other member. The members are secured together by the locking key or wedge 6 having flanges adapted to coact with the flanges of the coupling members. In the embodiment shown in Figs. I to IX, inclusive, this locking key is provided with diverging flanges 7 at its longitudinal edges adapted to fit within the converging members of the coupling members.

In the embodiment shown in Figs. X to XIV the coupling member is provided with converging members 7' adapted to embrace the diverging flanges 5' of the coupling members. The wedge or locking key is engaged with the coupling members by driving longitudinally. Its flanges coacting with the flanges of the coupling members form a connecting bridge for the coupling members firmly locking them together as a rigid unit.

In the embodiment shown in Figs. I to IX inclusive, where the flanges of the coupling members embrace the key, the key is driven with its small end forward. Where the flanges of the key embrace the flanges of the coupling members the key is driven with its large end forward, the locking effect being substantially the same in each instance. The flanges 7 are preferably cut away intermediate their ends, as at 8, so that the flanges 7 bear on the coupling members at their ends only. The keys are preferably slightly longitudinally curved or crowned, which tends to force the parts to be joined forwardly, forming a tight joint along their front or edges, which are usually exposed to view. To assist in alining the coupling members I provide the member 3 with a flange-like lug 9 at its lower end and the section 4 with an inwardly facing hook 10 adapted to engage over the lug when the parts are in alinement. In this form the hook and lug tend also to prevent longitudinal separation of the coupling members, although the key is quite effective for that purpose without these co-engaging parts.

In the modified form shown in Figs. VI and VII the lug 11 on the section 3 is provided with a central notch 12, while the lug 13 on the section 4 is provided with rib or projection 14 engaging this groove. The main purpose of the co-engaging parts in this embodiment is to assist in alining them on the parts to be joined.

In the modification shown in Fig. VIII the member 3 is provided with a dove-tailed slot 15 in its abutting end, while the member 4 has a tongue 16 fitting this slot. In this embodiment the co-engaging parts perform the function of alining and also support the coupling members against longitudinal separation.

In the modification shown in Fig. IX the member 3 is provided with a curved slot 17, while the member 4 has a corresponding shaped tongue or lug 18. The co-engaging parts in this embodiment merely serve to aline the members. When the key is driven home in the coupling members it covers the attaching screws 19 and also these co-engaging parts. This lends a finished appearance and the structure is very compact.

The points in which the modified structure shown in Figs. X to XIV differ from that of Figs. I to V have been pointed out. The embodiment shown in Figs. X to XIV has some advantages over that shown in Figs. I to V, particularly that of finish and appearance, as the locking key substantially covers all the other parts of the coupling.

In all of the embodiments of my invention illustrated the parts are simple and economical to produce. The parts are very easily assembled on the parts to be joined and when assembled it is only necessary to drive in the keys to secure them. The parts are also readily released by driving out the keys. This enables the shipping of the furniture in the knockdown and it can be readily set up by the dealer or user without the aid of tools, other than a hammer. The parts are formed of sheet metal and are comparatively simple to produce. There is practically no waste of stock. The edges of the key flanges bear in the coupling members so that they cannot cut into the wood as the keys are driven home.

Having thus described my invention, what I claim as new and desire to secure by Letters Patent, is:

1. A device of the class described, comprising a pair of tapered coupling members having outwardly converging flanges at their longitudinal edges, said members being disposed in alinement end to end, the taper of one member being uniform with the other, one member being provided with an outwardly projecting lug at its meeting end and the other with an inwardly facing lug engaging hook, said members being perforated between their flanges to receive attaching screws, and a tapered key member having inwardly projecting diverging flanges at its longitudinal edges engaged within the flanges of said coupling members and covering the attaching screws and the said hook and lug thereof.

2. A device of the class described, comprising a pair of tapered coupling members having outwardly converging flanges at their longitudinal edges, said members being disposed in alinement end to end, the taper of one member being uniform with the other, and a tapered key member having inwardly projecting diverging flanges at its longitudinal edges engaged within the flanges of said coupling members.

3. A device of the class described, comprising a pair of tapered coupling members comprising base portions having outwardly converging flanges at their longitudinal edges, said members being disposed in alinement end to end, the taper of one member being uniform with the other, and a tapered key member having inwardly projecting diverging flanges at its longitudinal edges engaged within the flanges of said coupling members, the said key member flanges being shaped to engage the base portions of said coupling members only at its ends.

4. A device of the class described, comprising a pair of tapered coupling members having outwardly converging flanges at their longitudinal edges, said members being in alinement end to end, the taper of one member being uniform with the other, said members being provided with co-engaging alining members on their meeting edges and being perforated between their flanges to receive attaching screws, and a tapered key member having inwardly projecting diverging flanges at its longitudinal edges engaged within the flanges of said coupling members and covering the attaching screws and the said members of said coupling members.

5. A device of the class described, comprising a pair of tapered coupling members having outwardly projecting flanges at their longitudinal edges, said members being in alinement end to end, the taper of one member being uniform with the other, said members being perforated between their flanges to receive attaching screws, and a tapered key member having inwardly projecting flanges at its longitudinal edges engaged with the flanges of said coupling members.

6. A device of the class described, comprising a pair of tapered coupling members having outwardly converging flanges at their longitudinal edges, said members being in alinement end to end, the taper of one member being uniform with the other, said members being provided with co-engaging members on their meeting edges, and a tapered key member having inwardly projecting diverging flanges at its longitudinal edges engaged within the flanges of said coupling members.

7. In a structure of the class described, the combination of a pair of channel-shaped tapered coupling members disposed in alinement end to end to face outwardly, the taper of one being uniform with the other, said members being perforated between their flanges to receive attaching screws and being provided with co-engaging parts at their meeting ends, and a channel-shaped tapered locking key engaging the flanges of said coupling members and covering the attaching screws thereof and the said co-engaging parts thereof.

8. In a structure of the class described, the combination of a pair of channel-shaped tapered coupling members disposed in alinement end to end to face outwardly, the taper of one being uniform with the other, and a channel-shaped tapered locking key engaging the flanges of said coupling members.

In witness whereof, I have hereunto set my hand and seal in the presence of two witnesses.

WILLIAM A. WIESMAN. [L. S.]

Witnesses:
    FREDERICK E. BAKER,
    EARLE S. CLARK.

Copies of this patent may be obtained for five cents each, by addressing the "Commissioner of Patents, Washington, D. C."